(12) United States Patent
Franke et al.

(10) Patent No.: US 9,307,286 B2
(45) Date of Patent: Apr. 5, 2016

(54) MODULAR DIGITAL TELEVISION DECODER

(76) Inventors: Volker Franke, Apolda (DE); Michael Pauli, Sachsen (DE); Guido Richardt, Mühlhausen (DE)

( * ) Notice: Subject to any disclaimer, the term of this patent is extended or adjusted under 35 U.S.C. 154(b) by 336 days.

(21) Appl. No.: 13/034,446

(22) Filed: Feb. 24, 2011

(65) Prior Publication Data

US 2011/0292294 A1 Dec. 1, 2011

Related U.S. Application Data

(63) Continuation of application No. PCT/EP2009/006191, filed on Aug. 26, 2009.

(30) Foreign Application Priority Data

Aug. 27, 2008 (EP) .................................... 08015137

(51) Int. Cl.
| | |
|---|---|
| *H04N 7/173* | (2011.01) |
| *H04N 21/4363* | (2011.01) |
| *H04N 21/418* | (2011.01) |
| *H04N 21/426* | (2011.01) |

(52) U.S. Cl.
CPC ..... *H04N 21/43632* (2013.01); *H04N 21/4183* (2013.01); *H04N 21/4263* (2013.01)

(58) Field of Classification Search
CPC .................................................. H04N 21/4183
See application file for complete search history.

(56) References Cited

U.S. PATENT DOCUMENTS

| | | | | |
|---|---|---|---|---|
| 6,199,168 | B1 * | 3/2001 | Miller ........................... | 713/300 |
| 7,649,949 | B2 * | 1/2010 | Williams et al. ............... | 375/259 |
| 2002/0008779 | A1 * | 1/2002 | Ju et al. .......................... | 348/552 |
| 2005/0039218 | A1 * | 2/2005 | Hundhausen et al. ........ | 725/131 |
| 2005/0097616 | A1 | 5/2005 | Numata | |
| 2007/0028260 | A1 | 2/2007 | Williams et al. | |
| 2007/0177736 | A1 * | 8/2007 | Nakamura et al. ............ | 380/270 |
| 2007/0234384 | A1 * | 10/2007 | Rein ............................... | 725/37 |
| 2008/0172504 | A1 * | 7/2008 | Kimura et al. .................. | 710/63 |
| 2008/0212774 | A1 * | 9/2008 | Moors et al. ................... | 380/201 |
| 2009/0077607 | A1 * | 3/2009 | Doumuki .................. | H04N 5/64 725/123 |
| 2010/0208830 | A1 * | 8/2010 | Lowe et al. ............. | 375/240.25 |
| 2011/0211118 | A1 * | 9/2011 | Han ...................... | G06F 3/1431 348/564 |
| 2013/0132171 | A1 * | 5/2013 | Barton ........................ | 705/14.4 |

FOREIGN PATENT DOCUMENTS

| | | | |
|---|---|---|---|
| CN | 2876893 Y | 3/2007 | |
| EP | 1156671 A2 | 11/2001 | |
| EP | 1631072 A1 | 3/2006 | |
| NZ | WO0235838 * | 5/2002 | ............... H04N 7/16 |
| WO | WO 02/35838 A1 | 5/2002 | |

(Continued)

OTHER PUBLICATIONS

International Search Report for International Application No. PCT/EP2009/006191, dated Dec. 3, 2009, 3 pages.

(Continued)

*Primary Examiner* — Fernando Alcon
(74) *Attorney, Agent, or Firm* — Brinks Gilson & Lione

(57) ABSTRACT

The present invention relates to a modular device for receiving digital television signals, as well as to a modular device for decoding digital television signals, wherein corresponding interfaces are provided to couple the modular device for data and power transfer.

20 Claims, 8 Drawing Sheets

(56) References Cited

FOREIGN PATENT DOCUMENTS

| WO | WO 03/107537 A2 | 12/2003 |
| WO | WO 2007/072211 A2 | 6/2007 |
| WO | WO 2007/125223 A2 | 11/2007 |

OTHER PUBLICATIONS

International Preliminary Report on Patentability for International Application No. PCT/EP2009/006191, dated Mar. 1, 2011, 8 pages.

* cited by examiner

MODULAR DIGITAL TELEVISION DECODER

RELATED APPLICATIONS

The present patent document is a continuation of PCT Application Serial No. PCT/EP2009/006191, filed Aug. 26, 2009, designating the United States and published in English. The PCT application claims the benefit of the filing date of European Patent Application No. 08015137.6 filed Aug. 27, 2008. All of the foregoing applications are hereby incorporated by reference.

FIELD OF THE INVENTION

The present invention relates to a modular digital television decoder as well as a receiver for digital multimedia signals, and in particular to a modular digital television decoder and a receiver for digital multimedia signals permitting a modular assembly and reduced overall dimensions of the corresponding components.

SUMMARY OF THE INVENTION

The present invention provides a device for decoding digital multimedia signals or a device for receiving digital multimedia signals that enables a simplified, flexible adjustment to national or regional circumstances.

According to an exemplary embodiment of the invention there is provided a device for decoding digital multimedia signals with a back end assembly group designed for the data processing of digital multimedia signals, a high definition multimedia interface (HDMI) designed for the detachable connection of a multimedia device, as well as a front end interface designed for the connection of an external front end assembly group.

This makes it possible to provide a device for decoding digital multimedia signals, which can be given a compact design owing to its connectivity to an external front end assembly group, wherein the front end assembly group can in turn comprise a regional or market-dependent power supply unit or tuner and demodulator units. The device for decoding digital multimedia signals can itself in turn be connected to a multimedia device, for example an HDMI-ready television with tube display or an HDMI-ready plasma or LCD display. Since the relatively voluminous components of a front end group need not be present in the device for decoding digital multimedia signals itself, the device for decoding digital multimedia signals can be compact in design; for example, the device for decoding digital multimedia signals can be designed as a stick, e.g., which can be inserted directly into the corresponding port of an HDMI-ready multimedia device. All functionalities of a front end assembly group can be provided to the device for decoding digital multimedia signals via a front end assembly group interface. The device for decoding digital multimedia signals, for example in the form of a high definition (HD) stick, can incorporate the functionality of demultiplexing, decoding, descrambling, etc. Further, the separate configuration of the device for decoding digital multimedia signals and an accompanying external front end module make it possible to avoid interference by the front end assembly module on the back end assembly owing to high frequency signals, for example. In addition, interference stemming from a power supply unit can be diminished, in particular when stronger interference can be expected from the power supply of the respective regional power supply system. Further, reverse interference from the back end assembly module on the front end assembly module can also be avoided. The high-frequency digital clocks in the back end, which currently measure in the radio reception frequency range of >100 MHz, can hence be decoupled from the front end assembly group. In addition, the separate configuration makes it possible to prevent exposure of the back end assembly module to heat from the power supply unit or tuner and demodulator assembly group. For example, the back end assembly group can be inserted directly into the multimedia device with an integrated plug-and-socket device, while a corresponding front end assembly module can be connected via the front end interface, but can also be provided separate or remote from the device for decoding digital multimedia signals, and connected with the latter by way of a cable joint, for example. Proceeding in this way makes it possible to separate analog data processing in a front end assembly group and digital data processing in a back end assembly group.

In an exemplary embodiment of the invention, the front end interface is designed for the detachable connection of a front end assembly group. In this way, the detachable connection of the device for decoding digital multimedia signals to an external front end assembly group can flexibly respond to regional market circumstances, in particular to different system voltage levels and system frequencies, as well as to different circumstances relative to the prepared reception signals. As a result, the regional market differences can be addressed just by correspondingly adjusting the front end assembly module, without changing the device for decoding digital multimedia signals, in particular its back end assembly module. In particular in Latin American markets, the 60 Hz system frequency deviates from that of the European markets. In addition, transmission standards other than those common to Europe can be used in Latin America, for example ISDB-T instead of DVB-T, so that the actual device for decoding digital multimedia signals can be retained by correspondingly providing an adjusted front end assembly group.

In an exemplary embodiment of the invention, the front end interface comprises a coupling area for coupling an external power supply to the device for decoding digital multimedia signals.

In this way, the power supply for a back end assembly group or device for decoding digital multimedia signals can be provided in an external front end assembly group, so that the same power supply components can be used for the front end assembly group power supply and back end assembly group power supply. Further, the heat generated in the device for decoding digital multimedia signals can be reduced, since using an externally provided power supply unit makes it possible to avoid transformer or switched-mode power supply losses in the form of heat from acting on the device for decoding digital multimedia signals. This is important especially in cases where the device for decoding digital multimedia signals comprises small or very small dimensions, in particular if the device for decoding digital multimedia signals is provided in the form of a stick.

In an exemplary embodiment of the invention, the back end assembly group comprises an assembly from a group consisting of a data processor, a RAM memory, a flash memory and a smart card processor. In this way, signals can be processed within the device for decoding digital multimedia signals based on the signals put out by a demodulator.

In an exemplary embodiment of the invention, the data processor comprises at least one assembly from a group consisting of a demultiplexer, a descrambler, a decryption device, an MPEG decoder and a digital/analog converter.

In this way, a digital data stream routed from a front end module via the front end interface to the device for decoding digital multimedia signals can be processed within the device for decoding digital multimedia signals.

In an exemplary embodiment of the invention, the data processor comprises a smart card processor, as well as either one descrambler or a decryption device for receiving encrypted programs.

In this way, encrypted programs for which a smart card owner has authorization can be received within the device for decoding digital multimedia signals, taking into account a personalization performed by a smart card. In particular, all measures relating to a personalization and generation of signals for a multimedia receiver can be realized within the compact device for decoding digital multimedia signals, so that this device for decoding digital multimedia signals can be provided in the form of a stick, for example. The stick design makes it possible to secure the device for decoding digital multimedia signals directly to the multimedia receiver, for example, wherein this attachment generally takes place on the rear side of the multimedia receiver. A corresponding design for the plug-and-socket connection makes it possible to avoid another attachment as well, for example, or secure the stick to the multimedia receiver using additional, secondary detachable or non-detachable attachment means.

In an exemplary embodiment of the invention, the back end assembly group comprises at least one data processor, a RAM memory and a flash memory, and the data processor comprises at least one demultiplexer, an MPEG decoder and a digital/analog converter.

In this way, all functions required for digital processing and preparing of digital multimedia signals can be concentrated on or in the device for decoding digital multimedia signals.

In an exemplary embodiment of the invention, the device for decoding digital multimedia signals is further provided with a user interface, which is designed to enable an exchange of data between an operator panel and a device for decoding digital multimedia signals.

This makes it possible to operate the device for decoding digital multimedia signals. For example, this can take place via an external keyboard, but also by way of a wireless interface, with which an infrared keyboard or infrared mouse can be used with the device for decoding digital multimedia signals, for example. As a result, the device for decoding digital multimedia signals can be kept compact. Further, for example, the front end interface can be used for implementing a user interface, so that an operator station can also be connected via an external device, the external device of which can then be connected via the front end interface to the device for decoding digital multimedia signals.

In an exemplary embodiment of the invention, the user interface is designed as an infrared interface.

For example, this makes it possible to avoid a plug connection that takes up a lot of space, and further to reduce the number of lines connected with the device for decoding digital multimedia signals.

One exemplary embodiment of the invention provides a device for receiving digital multimedia signals, wherein the device for receiving digital multimedia signals comprises a signal input interface for digital multimedia signals, a front end assembly group designed for receiving digital multimedia signals, a power supply unit for the device for receiving digital multimedia signals and a back end interface designed for connecting an external back end assembly group.

This makes it possible to provide a device for receiving digital multimedia signals without at the same time having to incorporate a device designed to decode digital multimedia signals inside the device for receiving digital multimedia signals. In other words, the process of receiving digital multimedia signals can be spatially separated from the process of decoding digital multimedia signals. As a result, the device for receiving digital multimedia signals can be designed with a limited scope of components for adjustment to regional markets, for example with respect to system voltages and system frequencies, as well as in terms of standard relative to digital multimedia signals to be received. In this case, digital multimedia signals can be received via the signal input interface. Digital multimedia signals must here be understood as signals used for processing and display purposes in digital multimedia devices. In this case, the digital multimedia signals can indeed comprise analogous characteristics, just as can take place during transfer via cable or wireless transmission channels. The digital multimedia signals that come in via the signal input interface can then be received in a front end assembly group. The power supply unit can be used to supply the power required to the device for receiving digital multimedia signals. An external back end assembly group can be coupled using a provided back end interface, so that both the received and demodulated digital multimedia signals can be relayed via the back end interface to an external back end assembly group, and a power supply can be provided for an external back end assembly group. In this way, the device for receiving digital multimedia signals can incorporate a power supply unit that not just supplies power to the device for receiving digital multimedia signals, but also can supply power to an external back end assembly group, if needed. Hence, the device for receiving digital multimedia signals can be designed without regard to the requirements of an external back end assembly group, in particular with respect to reciprocal interference by high-frequency signals or interference owing to heat generation, e.g., by whatever power supply unit provided or other heat-releasing assemblies.

Such a device for receiving digital multimedia signals combined with a device for decoding digital multimedia signals can be used to provide a modular design of a digital television receiver, which enables a flexible and modular adjustment to regional market circumstances.

In an exemplary embodiment of the invention, the back end interface is designed for the detachable coupling of an external back end assembly group.

In this way, detachable coupling makes it possible to decouple the device for receiving digital multimedia signals from an external back end assembly group, for example to replace the latter. An exchange might become necessary if the configuration of a device for receiving digital multimedia signals requires another power supply unit or potentially another receiver owing to different regional market circumstances. On the other hand, it may be necessary to change out an external back end assembly group if, for example, an advancement in a standard leaves the device for receiving digital multimedia signals or a front end assembly group essentially unchanged, while an advanced external back end group might potentially satisfy an advanced standard, or, for example, an enhanced functionality can be provided on the external back end assembly group, e.g., if the end user decides to upgrade his external back end assembly group, without then absolutely having to also replace the device for receiving digital multimedia signals or the front end assembly group.

In an exemplary embodiment of the invention, the back end interface comprises a coupling area for coupling the power supply unit to a couplable external back end assembly group.

In this way, the device for receiving digital multimedia signals can be used not only to provide a power supply for the device for receiving digital multimedia signals itself, but additionally a power supply for an external back end assembly group. The corresponding power supply unit can here be designed according to the power required by an external back end assembly group.

In an exemplary embodiment of the invention, the front end assembly group comprises a receiver for receiving digital multimedia signals and a demodulator for demodulating digital multimedia signals.

In this way, a digital multimedia signal can be received from an external signal source, for example a cable, a satellite or an antenna and demodulated accordingly, so that it is suitable for further processing in an external back end assembly group.

According to an exemplary embodiment of the invention, the digital multimedia signals are digital television signals.

Let it be noted that the digital multimedia signals can comprise audio and video signals.

One exemplary embodiment of the invention provides a modular digital multimedia receiver, with a device for receiving digital multimedia signals according to the invention as well as a device for decoding digital multimedia signals according to the invention, wherein the back end interface of the device for receiving digital multimedia signals is connected with the front end interface of the device for decoding digital multimedia signals.

In an exemplary embodiment of the invention, the back end interface of the device for receiving digital multimedia signals is connected with the front end interface of the device for decoding digital multimedia signals via an external line in such a way that the device for receiving digital multimedia signals can be arranged remote from the device for decoding digital multimedia signals. However, the device for receiving digital multimedia signals can also be arranged directly on the device for decoding digital multimedia signals, for example if the back end interface and front end interface are each designed as matching receptacles.

According to an exemplary embodiment of the invention the device for receiving digital multimedia signals is designed as a wall unit and the device for decoding digital multimedia signals is designed as a High Definition stick.

Thus, the wall unit can be located remote or spaced apart from the High Definition (HD) stick. This allows to separate the both units to avoid e.g. heat of the power supply from the HD stick and on the other hand to avoid magnetic fields of the wall unit close to the HD stick. The wall unit can be provided close to a grid plug on the wall, wherein the HD stick can be provided close to the TV or display device.

According to an exemplary embodiment of the invention the back end interface of the device for receiving digital multimedia signals and the front end interface of the device for decoding digital multimedia signals each are adapted to form a system connector, wherein the system connector comprises a first terminal group for TS signals and control signals.

Thus, a terminal group can be provided for high frequency signals which is separated from e.g. the power supply of a separate terminal group.

According to an exemplary embodiment of the invention the system connector further comprises a second terminal group for power supply.

According to an exemplary embodiment of the invention the device for receiving digital multimedia signals and the device for decoding digital multimedia signals each comprise a plug, the plug having a plug section for the system connector and a plug section for power supply.

Thus, the plug sections can be allocated to separate functions without disturbing the data signals.

According to an exemplary embodiment of the invention the plug further having a plug section for an HDMI connection.

Thus, by a single plug, all relevant connections can be established, i.e. the data transfer in form of the TS signals and the control signals, the power supply and the HDMI connection.

According to an exemplary embodiment of the invention the external line comprises a first wire group for TS signals and control signals, wherein the first wire group is a twisted pair wire arrangement.

Thus, it is possible to provide high current signals allowing a low signal to noise ration and to eliminate disturbances to wire arrangement. A twisted pair wiring is insensitive against external magnetic fields and therefore inheres a low noise.

According to an exemplary embodiment of the invention the TS signals and the control signals are transmitted at different frequency bands.

Thus, a sufficient bidirectional data transmission can be established for both the TS signals and the control signals.

Let it be noted that individual features can of course also be combined with each other, yielding in part advantageous effects going beyond the sum of individual effects. These and other aspects of the present invention are explained and illustrated through reference to the exemplary embodiments described below.

BRIEF DESCRIPTION OF THE DRAWINGS

Exemplary embodiments will be described below, drawing reference to the following drawings.

DETAILED DESCRIPTION OF EXEMPLARY EMBODIMENTS

Digital television receivers (DFEG) are predominantly realized as so-called set-top boxes (STB), which can be placed in proximity to a playback device as a separate accessory, for example a television set. As a rule, a plurality of functional units is implemented in these set-top boxes (STB). A distinction is here essentially made between a front end module and back end module. For example, the front end module implements a tuner and demodulator. A demultiplexer, descrambler, programmable audio/video decoder, volatile user memory (RAM), and non-volatile program and data memory (NVRAM) are implemented in a back end module, for example. Also provided as a rule are a power supply, display and control elements and various ports. The control and display elements can here be LED's, infrared remote control receivers, card readers, keys, as well as numeric or alphanumeric displays. The provided ports may include a power supply port, a high-frequency input (HF) and, if necessary, an HF loop-through output as well as analog and/or digital video and audio outputs.

Since the set-top boxes are sold in the most varied of markets worldwide, these set-top boxes must be adjusted to the respective market, in particular with respect to the power supply and input signal, so that power supply units differing in terms of mains voltage and frequency must be provided, along with correspondingly adjusted tuner and demodulator configurations. On the other hand, digital signals are processed in a digital television receiver in accordance with national and international standards, so that a uniform signal is present at the corresponding video or audio outputs of a set-top box.

Hence, the high outlay associated with the area of known set-top boxes lies in the fact that the latter must be tailored to the respective national or regional market.

Figure 1:
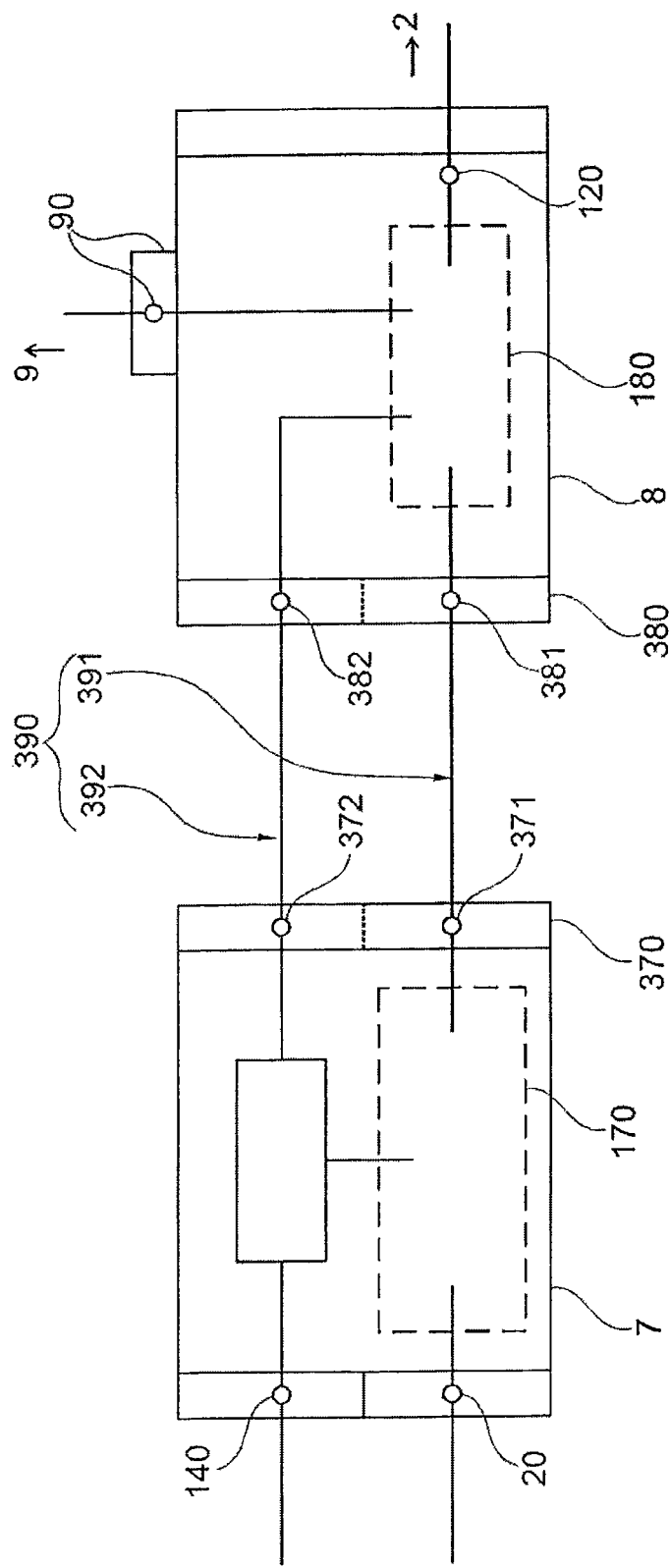
FIG. 1 shows the modular design and interaction between a device for decoding digital multimedia signals according to the invention and a device for receiving digital multimedia signals according to an exemplary embodiment of the invention.

The embodiment shown on FIG. 1 depicts a device for decoding digital multimedia signals 8 as well as a device for receiving digital multimedia signals 7. The device for decoding digital multimedia signals 8 and device for receiving digital multimedia signals 7 together form a modular digital multimedia receiver 1. While the device for receiving digital multimedia signal 7 is connected with the device for decoding digital multimedia signals 8 in the embodiment shown here, the present invention also relates separately to the respective device for decoding digital multimedia signals 8 or the device for receiving digital multimedia signals 7. The device for decoding digital multimedia signals 8 comprises a back end assembly module 180, which is designed for the data processing of digital multimedia signals. The device for decoding digital multimedia signals 8 further comprises a high definition multimedia interface (HDMI) 120, which is designed for the detachable connection of a multimedia device 2, which itself is not included in the subject matter of the present invention. The HDMI interface 120 is usually a standardized plug-and-socket connection. However, it is also possible to implement the device for decoding digital multimedia signals directly in the multimedia device 2, inside the casing of the multimedia device 2, wherein the interface 120 then can also be a non-detachable interface.

The device for decoding digital multimedia signals 8 also comprises a front end interface 380, which is designed for the connection of an external front end assembly group 170. The front end interface 380 can here comprise a coupling area 381 with which an external front end assembly group 170 can be connected, as well as another coupling area 382, with which an external power supply 130 can be connected for supplying power to the device for decoding digital multimedia signals 8 without having to provide a separate power supply unit for this purpose. Further, the device for decoding digital multimedia signals 8 can comprise a user interface 90 for coupling an operator panel 9, which is also not shown here and is not encompassed by the invention. The operator panel 9 can here be coupled using a wire connection, as well as an infrared interface. The advantage to an infrared interface here is that it avoids a mechanical plug-and-socket connection, which is prone to errors and requires a lot of space. For example, this user interface 90 can be used to connect a wireless mouse or wireless keyboard, or even an external, more complex operator panel, for example a remote control designed for this purpose. The infrared coupling can be replaced by a wireless radio link, for example, which does not absolutely require an unobstructed transmission path.

Also provided on FIG. 1 is a device for receiving digital multimedia signals 7. This embodiment of a device for receiving digital multimedia signals shown on FIG. 1 comprises a signal input interface 20 for digital multimedia signals. An external signal source can be connected to this signal input interface 20, for example an antenna for a terrestrial DVB-T signal, a cable for a cable DVB-C signal, or a satellite antenna for receiving a satellite DVB-S signal. In addition to the mentioned DVB-T, DVB-C and DVB-S signals, other signals can be received, such as a DVB-S2, ISDB-T, ATSC- or DVB-C2/T2 signal. The signal input interface generally is provided with a port for connecting an external receiver, for example an antenna. Further, the device for receiving digital multimedia signals 7 in the embodiment depicted here also comprises a front end assembly group 170, which is designed for receiving digital multimedia signals. In this case, digital multimedia signals received via the signal input interface 20 can be processed in the front end assembly module 170 and relayed to the back end interface 370. The back end interface 370 is provided with a coupling area 371 provided for this purpose, for example, to enable the connection of an external back end assembly group 180. Let it be noted that the external back end assembly group is not a component of the modular device for decoding digital multimedia signals 7.

The device for receiving digital multimedia signals 7 further comprises a power supply 130 to supply power to the device for receiving digital multimedia signals 7. This power supply 130 can be connected to an external power supply system, for example via a corresponding interface 140. The power supply 130 can be realized in the form of a transformer, for example, with a rectifier and a fixed-voltage regulator, or in the form of a switched-mode power supply, so as to provide the corresponding supply voltages for the device for receiving digital multimedia signals 7.

The device for receiving digital multimedia signals can also comprise a coupling area 372 in the area of the back end interface 370, which is designed to connect the power supply to a coupled external back end assembly module 180. In this way, the power supply 130 provided in the device for receiving digital multimedia signals 7 can be used not only supply power to the device for receiving digital multimedia signals, but also to supply power to a device for decoding digital multimedia signals 8.

The modular digital multimedia receiver 1 according to the embodiment shown on FIG. 1 comprises a connector 390 between the device for receiving digital multimedia signals 7 and the device for decoding digital multimedia signals 8, which can be provided in the form of a multi-pole line, for example. The multi-pole line can here comprise a line area or line group 391 designed to connect the coupling area 371 of the back end interface 370 with the coupling area 381 of the front end interface 380. In addition, the connector 390 can comprise a line area 392 designed to connect the coupling area 372 to the device for receiving digital multimedia signals 7 and the coupling area 382 of the device for decoding digital multimedia signals 8, so as to in this way enable the supply of power or energy to the components of the device for decoding digital multimedia signals 8. As a result, the connector 390 incorporates a power supply section 392 and a data transfer line area 391, which each can comprise a large number of lines. In the practical embodiment, the two devices 7 and 8 can be coupled by a cable connector and corresponding plugs or sockets, while the pin assignment of the plugs can be provided in such a way as to ensure conformity of line assignment in terms of power and data transfer. The expert will provide this line and plug connection pursuant to his technical knowledge.

As an alternative to the embodiment shown on FIG. 1, for example, the user interface 90 can also be designed as a coupling area in proximity to the front end interface 380, wherein a coupling area for a user interface can in this case also be provided at the corresponding back end interface 370, for example so that the control elements 9 can be implemented via a corresponding interface then to be provided on the device for receiving digital multimedia signals. The connector 390 or line can then comprise an additional line section or line group designed to transmit operator signals.

Figure 2:
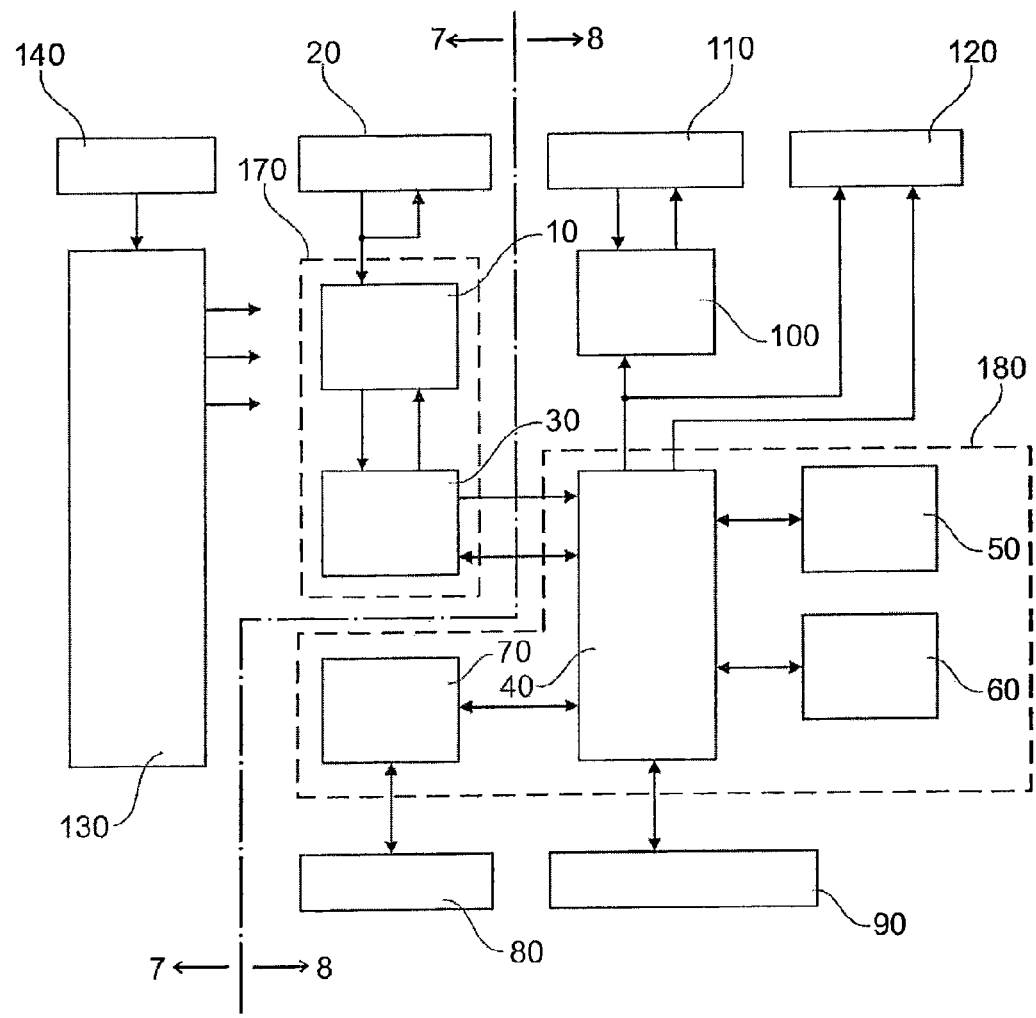
FIG. 2 shows a diagrammatic view of the interaction between various components relative to the device for decoding digital multimedia signals and the device for receiving digital multimedia signals according to an exemplary embodiment of the invention.

FIG. 2 shows a diagrammatic view of the functional correlations between various components of a device for receiving digital multimedia signals 7 or a device for decoding digital multimedia signals 8, as well as with external components thereof. The dashed line here shows the separation between the device for receiving digital multimedia signals 7 and the device for decoding digital multimedia signals 8. For example, the device for receiving digital multimedia signals 7 comprises a front end module 170 with a tuner IC and a demodulator IC, which are coupled together for data exchange. In the embodiment shown here, the demodulator IC 30 is used for coupling with the back end module 180 via the corresponding interfaces not denoted here in any greater detail. Further, the device for receiving digital multimedia signals is connected with a signal input interface 20, by way of which input signals can be relayed to the front end module, for example in the form of HF signals. In addition, the power supply 30 is provided with a power supply port 140, which is used for supplying power to the components of the device for receiving digital multimedia signals 7. The other functional links are not shown in any detail in the diagrammatic view depicted on FIG. 2. In addition to the back end module 180, the device for decoding digital multimedia signals 8 also comprises an interface 90 for control and display elements, for example, along with a port for a smart card 80, for example, in the form of a smart card slot. Also provided is a port connecting an HDMI-ready multimedia device 120. In addition, for example, a remodulator assembly group 100 can be provided, along with remodulator HF ports 110. For example, the back end module 180 can here comprise a back end processor IC 40, a RAM memory 50, a flash memory 60 and a smart card IC 70. The smart card IC can here be connected with the interface for the smart card 80, for example.

Figure 3:
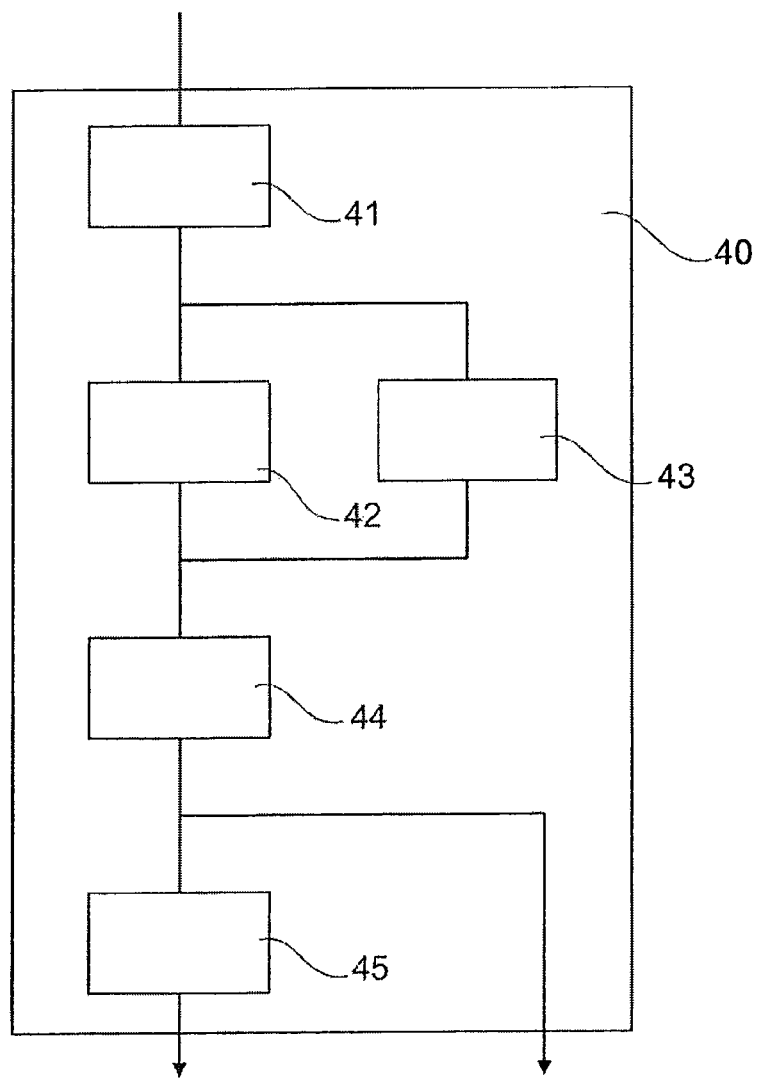
FIG. 3 shows an exemplary structure of a back end device or back end processor IC according to an exemplary embodiment of the invention.

FIG. 3 shows a more detailed diagrammatic view of a back end processor IC 40 according to an exemplary embodiment of the invention. For example, this back end processor IC can be provided with a demultiplexer 41, a descrambler 42 or a decryption device 43, an MPEG decoder 44 as well as an optional digital/analog converter 45. The digital/analog converter 45 is provided in particular for cases in which the signal output by the MPEG decoder is to be relayed to an analog-ready device, while the digital/analog converter can also be circumvented if the connected multimedia device is digital-ready. In one embodiment, for example, the signal fed into the data processor 40 is prepared by a demultiplexer 41 and descrambler 42 to isolate a signal for a channel. The channel-isolated signal is then decrypted by a decryption device 43 and then MPEG decoded, thereby yielding a displayable television signal.

Figure 4:
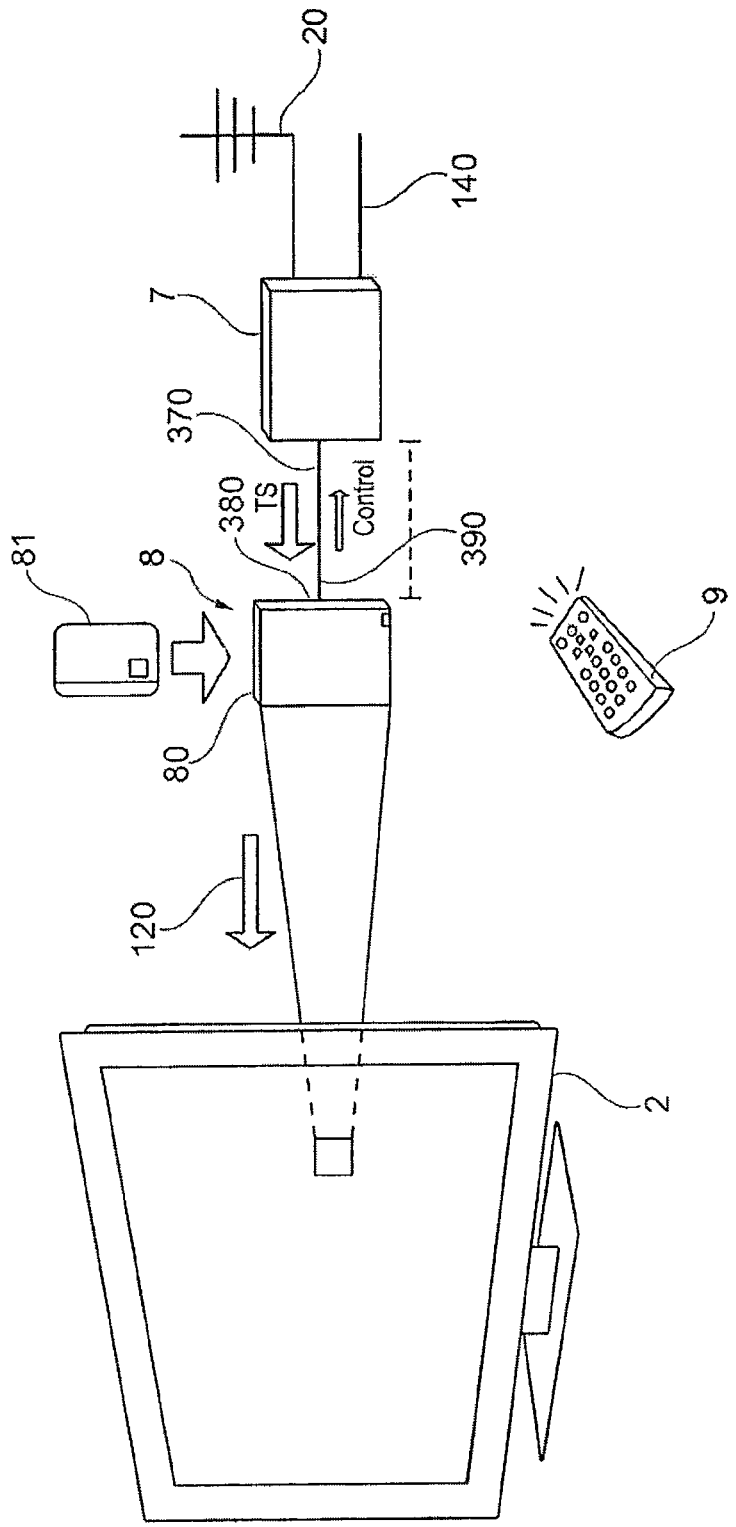
FIG. 4 shows an exemplary embodiment of an application of the invention.

FIG. 4 illustrates an exemplary embodiment of an application of the invention. FIG. 4 illustrates a device for decoding digital multimedia signals 8 in form of a high-definition stick (HD-stick). The HD-stick comprises a smartcard slot 80, into which a smartcard 81 can be inserted, for example for identifying the user and a respective access to services. The HD-stick can be connected to a multimedia display device 2, for example a TV by an HDMI connection 120. The HD-stick 8 comprises all relevant architecture for processing digital video signals. Remote of the HD-stick, a device for receiving digital multimedia signals 7 can be provided in form of a wall unit. Such a wall unit 7 can be provided remote of the HD-stick. The connection between the wall unit and the HD-stick may be several meters. Thus, the wall box can be provided adjacent to a plug to provide the wall box with electric energy, and/or close to an antenna plug or cable plug for providing the wall unit 7 with a respective high-frequency signal. On the other hand, the HD-stick 8 can be provided close to the TV 2. Thus, negative influences and disturbances originating from the wall unit, for example of the power supply of the wall unit can be avoided with respect to the HD-stick. Further, the wall unit can be exchanged according to the required specification of the wall unit depending on the regional aspects of power supply, the regional aspects of provided high-frequency signals and so on. The HD-stick and the wall unit can be connected with a connecting line, wherein the connecting line can be divided into several wiring sections according to the required functions between the wall unit 7 and HD-stick 8. Such sections may be provided for example for transmitting a transportation stream TS from the wall unit to the HD-stick or a control signal from the HD-stick to the wall unit. Such a transmission can be carried out via a so-called twisted pair wiring, in which two wires are twisted in order to eliminate induced transitional noise. Further, a connection line 390 can comprise a section for the power supply of the HD-stick from the wall unit.

The HD-stick may be controlled via remote control 9. However, the controlling of the HD-stick 8 can also be carried out via the TV 2 or a respective remote control of the TV. In this case the remote control 9 belongs to the TV 2 and the control of the HD-stick is carried out via the interface, which connects the HD-stick to the TV 2.

Figure 5:
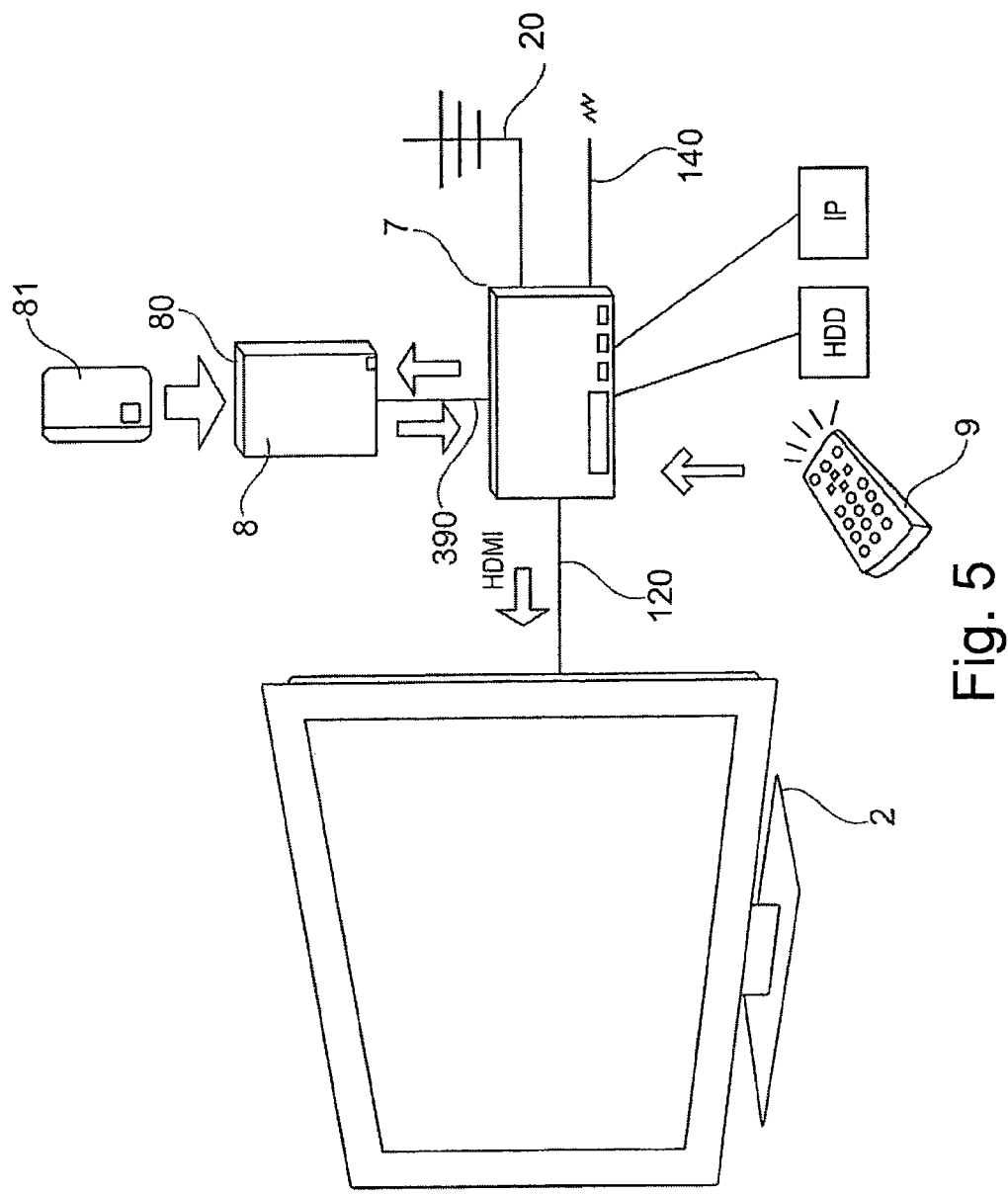
FIG. 5 shows another exemplary embodiment of an application of the invention.

FIG. 5 illustrates another exemplary embodiment of an application of the invention, in which the device for receiving digital multimedia signals 7 is provided in form of a so-called extension unit. This extension unit 7 functionally includes the wall unit and may further include additional functions like for example a hard disk drive HDD or an internet protocol connection IP. In correspondence with FIG. 4, the extension unit can be provided with an HF input 20 receiving the high-frequency signals. Instead of connecting the HD-stick 8 directly to the TV 2, the HD-stick 8 may also be connected to the TV 2 via the extension unit 7. In this case, the HDMI connection is established between the extension unit 7 and the TV 2, and the connection between the extension unit 7 and the HD-stick 8 can also carry the relevant HDMI information via the system controller between the HD-stick 8 and the extension unit 7. In correspondence with FIG. 4, the HD-stick may have a smartcard slot 80 for receiving a smartcard 81. A remote control 9 can be provided for controlling the extension unit. It should be noted, that the extension unit can further be connected to an additional wall unit, wherein the extension unit can have a first tuner type, wherein the additional wall unit can have an additional tuner type, so that the user can have two or more different tuner types, for example an terrestrial antenna and a cable TV or a satellite tuner. When providing an additional wall unit, the extension unit can be provided with electric energy via the additional wall unit. The extension unit may also receive additional components. It should be noted that it is also possible to leave out the extension unit and to directly plug the HD-stick to the TV 2.

Figure 6:
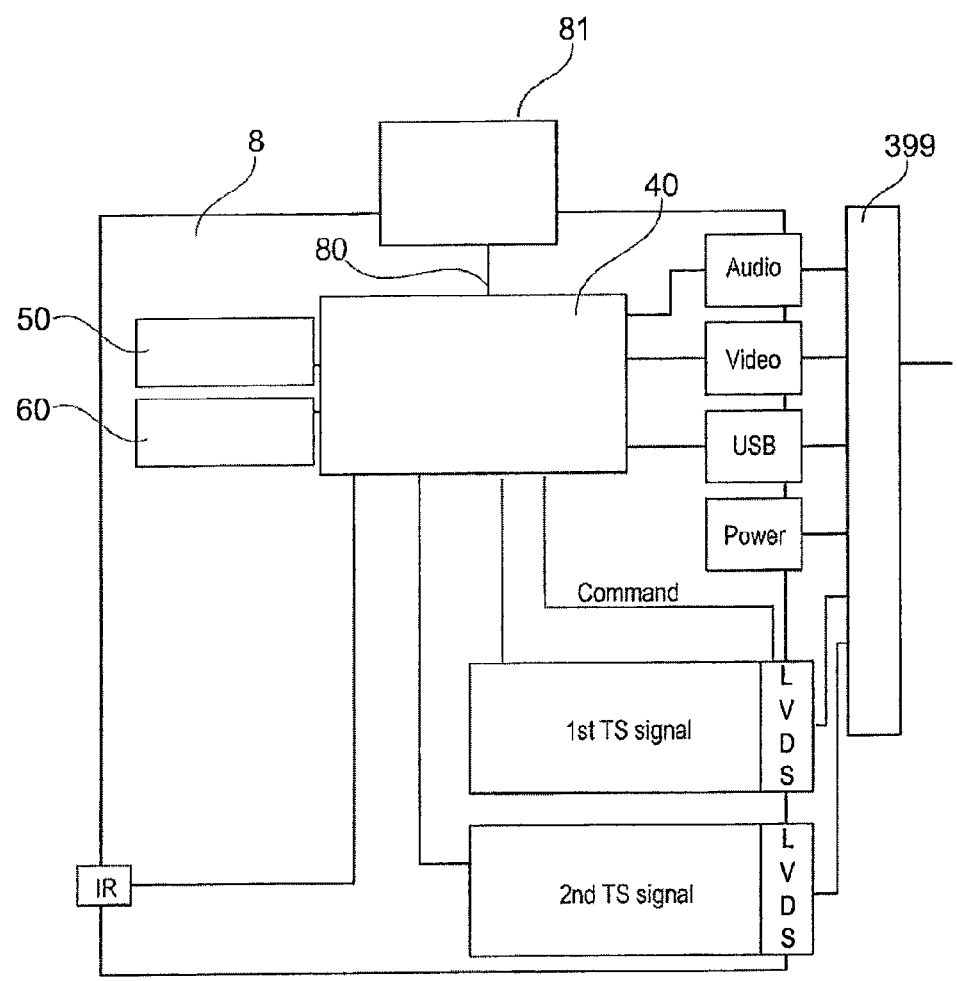
FIG. 6 shows a diagrammatic view of an exemplary embodiment of an HD stick according to the invention.

FIG. 6 illustrates a diagrammatic view of an exemplary embodiment of the HD-stick according to the invention. The HD-stick 8 may have a smartcard slot 80 for receiving a smartcard 81. The HD-stick comprises a smart card interface 80 and processor IC 40, a RAM memory 50 and a flash memory 60. The HD-stick can be provided with a system connector 399 which includes for example an audio connection, a video connection, an optional USB connection, a power supply connection and a connection with respect to a first transportation stream signal and an optional second transportation stream signal. This system connector can be provided in form of a compact and defined plug/socket geometry, so that it is possible to plug and connect all relevant connections simultaneously which increases the user-friendly handling of the HD-stick.

Figure 7:
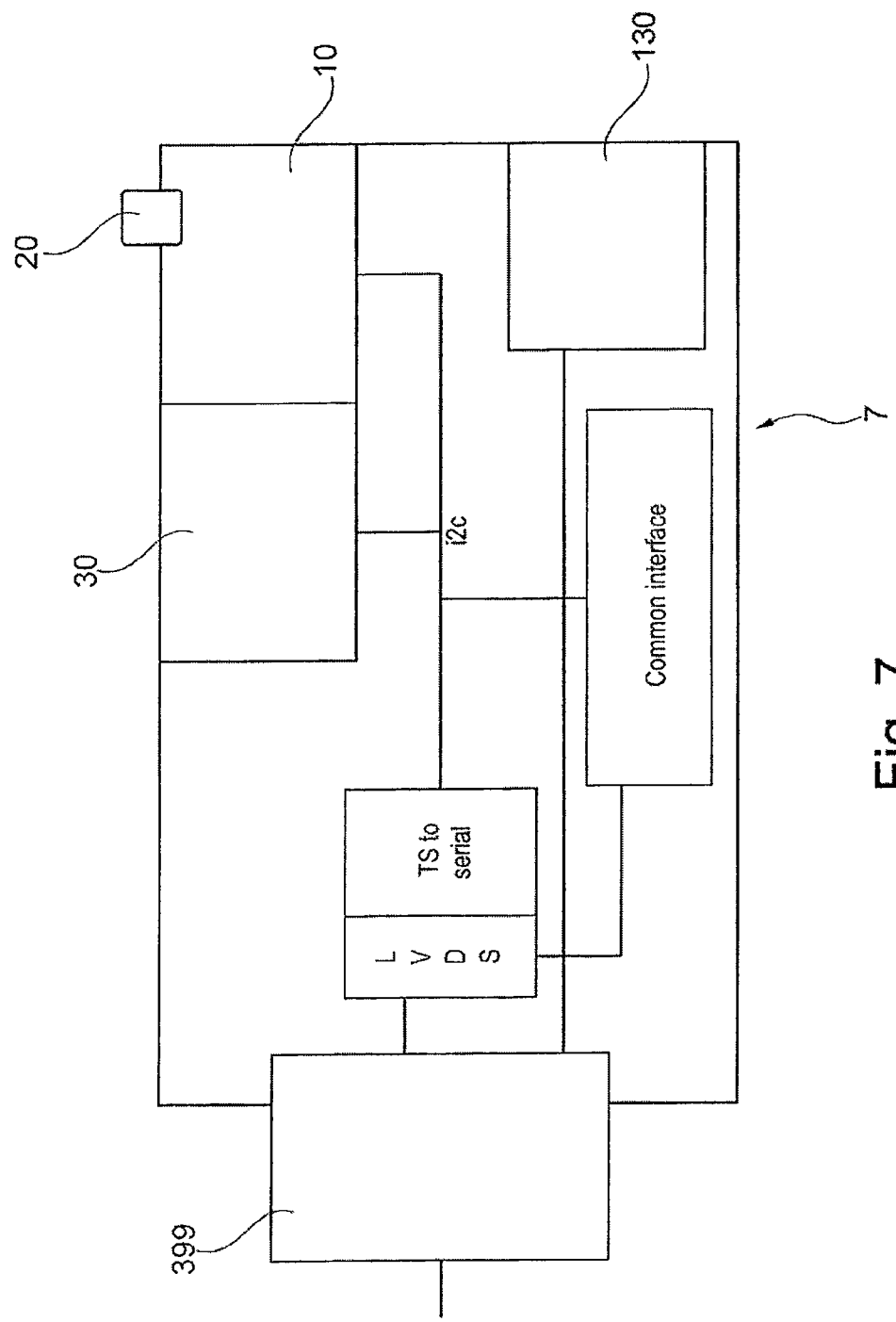
FIG. 7 shows a diagrammatic view of an exemplary embodiment of a wall unit according to the invention.

FIG. 7 illustrates a diagrammatic view of an exemplary embodiment of a wall unit 7, which wall unit also comprises a system connector 399. The wall unit may further comprise a tuner 10, a high-frequency input 20 and a demodulator IC 30. The wall unit may also be provided with a power supply unit 130.

The system connector 399 may correspond to the system connector of the HD-stick. This means, that the system connector 399 comprises a section for the TS transmission and the control transmission, wherein the TS transmission and the control transmission can be carried out via a so-called twisted pair connection. In addition, the system connector may include a power supply connection. Thus, the system connector 399 can be provided with a minimum number of wires for transmitting the relevant data and power from the wall unit 7 to the HD-stick 8 and vice versa.

Figure 8:
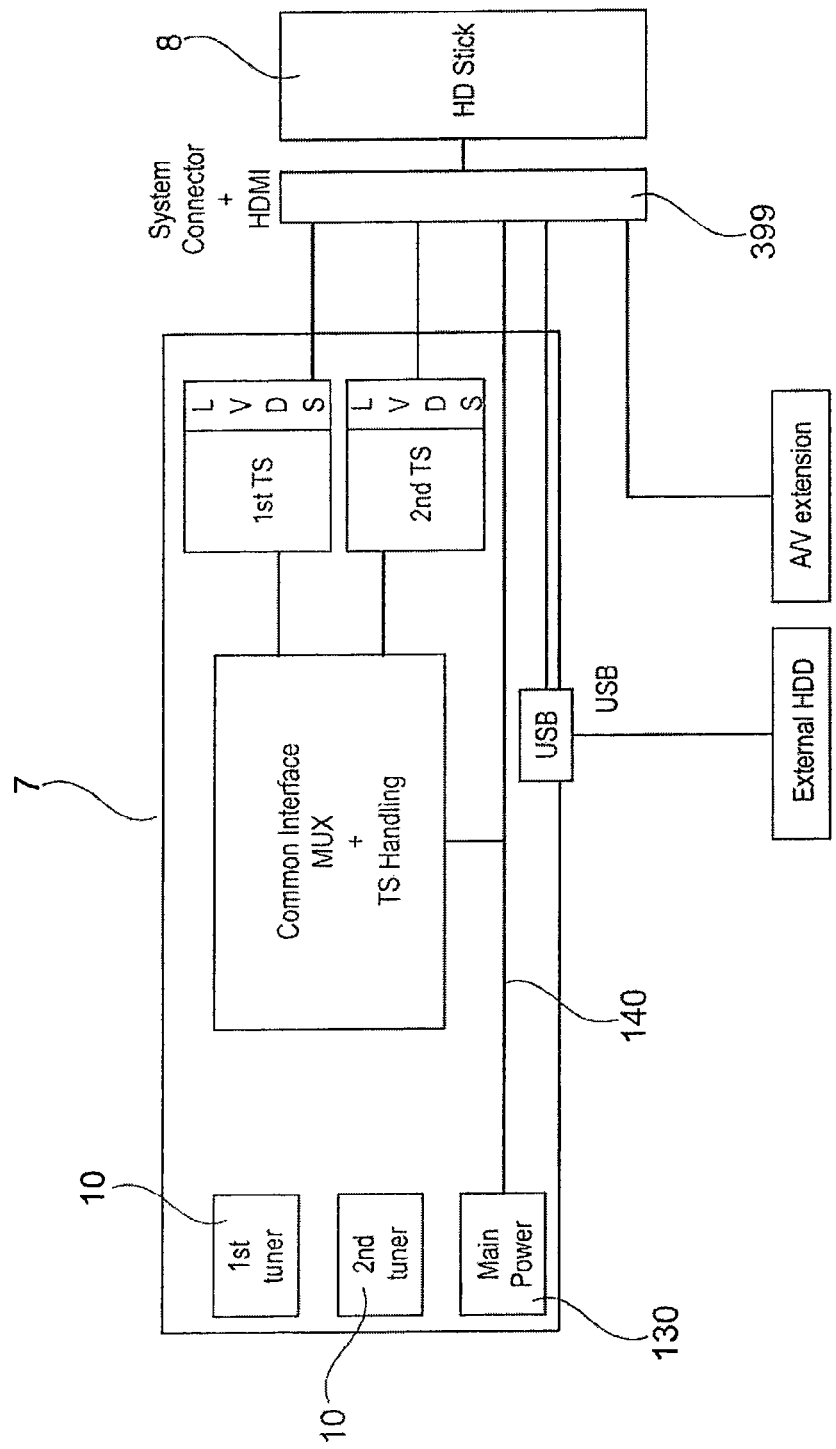
FIG. 8 shows a diagrammatic view of an exemplary embodiment of an extension unit functionally including a wall unit according to the invention.

FIG. 8 illustrates a diagrammatic view of an exemplary embodiment of an extension unit 7 including a first tuner and a second tuner as well as a power supply 130. In addition to the base functions of a wall unit, the extension unit can further comprise additional components, like for example a hard disk drive etc. It should be noted that the hard disk drive may be an internal hard disk drive and an external hard disk drive.

It should be noted that the system connector of the HD-stick can be either connected to the system connector of a TV 2 or to an extension unit, wherein the extension unit than will be connected to the TV 2 with an HDMI connection.

The extension unit can be provided with a plurality of tuners, which may be tuners of different types. Further a full audio/video connection can be provided as well as an IP connection, for example web TV or an IP connection to re-encode content to play on a second or third TV.

It should be noted that, in addition to receiving digital television signals, the present invention can also be used for receiving digital broadcast signals of any kind, in particular for any transmission of video and/or audio signals.

LET IT BE NOTED THAT THE TERM "COMPRISING" DOES NOT PRECLUDE OTHER ELEMENTS AND PROCEDURAL STEPS, JUST AS THE TERM "A" AND "AN" DOES NOT EXCLUDE SEVERAL ELEMENTS AND STEPS. ALSO ELEMENTS DESCRIBED IN ASSOCIATION WITH DIFFERENT EMBODIMENTS MAY BE COMBINED. IT SHOULD ALSO BE NOTED THAT REFERENCE SIGNS IN THE CLAIMS SHALL NOT BE CONSTRUED AS LIMITING THE SCOPE OF THE CLAIMS.

REFERENCE LIST

1 Device for receiving digital television signals
2 Multimedia device
7 Device for receiving digital multimedia signals
8 Device for decoding digital multimedia signals
9 Operator panel
10 Tuner IC
20 HF signal ports
30 Demodulator IC
40 Back end processor IC
41 Demultiplexer
42 Descrambler
43 Decryption device
44 MPEG decoder
45 Digital/analog converter
50 RAM memory
60 Flash memory
70 Smart card IC
80 Smart card slot
90 Control and display elements
100 Remodulator assembly group
110 Remodulator HF ports
120 RCA/Toslink audio and video outputs or HDMI interface
130 Power supply circuit
140 Power supply port
170 Front end module or assembly group
180 Back end module or assembly group
370 Back end interface
371 Coupling area, data transmission back end interface
372 Coupling area, power supply back end interface
380 Front end interface
381 Coupling area, data transmission front end interface
382 Coupling area, power supply front end interface
390 Connector or line or line bundle
391 Line group, data transmission
392 Line group, power supply
399 System connector

The invention claimed is:

1. A modular digital multimedia receiver, comprising:
a receiving device for receiving digital multimedia signals, the receiving device configured as a wall unit, and
a decoding device for decoding digital multimedia signals in a form of a stick,
wherein the receiving device for receiving digital multimedia signals comprises a signal input interface for communication of digital multimedia signals, a front end assembly group configured to receive the digital multimedia signals from the signal input interface, a power supply for the device for receiving digital multimedia signals, and a back end interface,
wherein the decoding device for decoding digital multimedia signals, in the form of the stick, comprises a front end interface configured to receive the digital multimedia signals from the back end interface of the receiving device, a back end assembly group configured to process the digital multimedia signals received by the front end interface, and an HDMI interface designed for detachably coupling a multimedia device and configured to communicate the digital multimedia signals processed by the back end assembly group to the multimedia device, and
wherein the back end interface of the receiving device and the front end interface of the decoding device are configured to be:
detachably coupled to each other, and
when coupled to each other, spaced apart by an external line that communicates the digital multimedia signals between the back end interface of the receiving device and the front end interface of the decoding device.

2. The modular digital multimedia receiver according to claim 1, wherein the front end interface comprises a front end interface for coupling an external power supply to the decoding device for decoding digital multimedia signals.

3. The modular digital multimedia receiver according to claim 1, wherein the back end assembly group comprises at least one assembly from a group consisting of:
- a data processor;
- a RAM memory;
- a flash memory; and
- a smart card processor.

4. The modular digital multimedia receiver according to claim 3, wherein the data processor comprises at least one assembly from a group consisting of:
- a demultiplexer;
- a descrambler;
- a decryption device;
- an MPEG decoder; and
- a digital/analog converter.

5. The modular digital multimedia receiver according to claim 3, wherein the data processor comprises a smart card processor as well as either a descrambler or decryption device for receiving decrypted programs.

6. The modular digital multimedia receiver according to claim 3, wherein the back end assembly group comprises at least one data processor, a RAM memory and a flash memory, and the data processor comprises at least one demultiplexer, an MPEG decoder and a digital/analog converter.

7. The modular digital multimedia receiver according to claim 1, further comprising a user interface designed to enable data exchange between an operator panel and the decoding device for decoding digital multimedia signals.

8. The modular digital multimedia receiver according to claim 7, wherein the user interface is an infrared interface.

9. The modular digital multimedia receiver according to claim 1, wherein the back end interface is designed for the detachable coupling of an external back end assembly group.

10. The modular digital multimedia receiver according to claim 1, wherein the back end interface comprises a coupling area for coupling an external power supply to a couplable external back end assembly group.

11. The modular digital multimedia receiver according to claim 1, wherein the front end assembly group comprises a receiver for receiving digital multimedia signals and a demodulator for demodulating digital multimedia signals.

12. The modular digital multimedia receiver according to claim 1, wherein the digital multimedia signals are digital television signals.

13. The modular digital multimedia receiver according to claim 1, wherein the stick comprises a High Definition stick.

14. The modular digital multimedia receiver according to claim 1, wherein the back end interface of the receiving device for receiving digital multimedia signals and the front end interface of the decoding device for decoding digital multimedia signals each are adapted to form a system connector, wherein the system connector comprises a first terminal group for TS signals and control signals.

15. The modular digital multimedia receiver according to claim 14, wherein the system connector further comprises a second terminal group for power supply.

16. The modular digital multimedia receiver according to claim 14, wherein the receiving device for receiving digital multimedia signals and the decoding device for decoding digital multimedia signals each comprise a plug, the plug having a plug section for the system connector and a plug section for a power supply.

17. The modular digital multimedia receiver according to claim 16, wherein the plug further having a plug section for an HDMI connection.

18. The modular digital multimedia receiver according to claim 1, wherein the external line comprises a first wire group for TS signals and control signals, wherein the first wire group is a twisted pair wire arrangement.

19. The modular digital multimedia receiver according to claim 18, wherein the TS signals and the control signals are transmitted at different frequency bands.

20. A device comprising:
- a stick configured to decode digital multimedia signals received from a receiving device configured as a wall unit and send the decoded digital multimedia signals to a multimedia device, the stick comprising:
  - a front end interface configured to receive the digital multimedia signals from a back end interface of the receiving device, wherein the front end interface is configured to be detachably coupled to the back end interface via an external line that spaces apart the stick from the receiving device;
  - a back end assembly group configured to process the digital multimedia signals received by the front end interface; and
  - an HDMI interface designed for detachably coupling the multimedia device and configured to communicate the digital multimedia signals processed by the back end assembly group to the multimedia device.

* * * * *